(12) United States Patent
Chiang et al.

(10) Patent No.: US 9,194,991 B2
(45) Date of Patent: Nov. 24, 2015

(54) FIBER OPTIC SENSOR MANUFACTURING METHOD AND STRUCTURE THEREOF

(71) Applicants: Chia-Chin Chiang, Kaohsiung (TW); Kuang-Chuan Liu, Kaohsiung (TW)

(72) Inventors: Chia-Chin Chiang, Kaohsiung (TW); Kuang-Chuan Liu, Kaohsiung (TW)

(73) Assignee: National Kaohsiung University of Applied Sciences, Kaohsiung (TW)

( * ) Notice: Subject to any disclaimer, the term of this patent is extended or adjusted under 35 U.S.C. 154(b) by 244 days.

(21) Appl. No.: 13/917,693

(22) Filed: Jun. 14, 2013

(65) Prior Publication Data

US 2014/0369641 A1    Dec. 18, 2014

(51) Int. Cl.
| | |
|---|---|
| G02B 6/12 | (2006.01) |
| G02B 6/00 | (2006.01) |
| G01D 5/353 | (2006.01) |
| G01K 1/14 | (2006.01) |
| G01K 11/32 | (2006.01) |
| G01L 1/24 | (2006.01) |
| G02B 6/34 | (2006.01) |

(52) U.S. Cl.
CPC .............. *G02B 6/00* (2013.01); *G01D 5/35316* (2013.01); *G01K 1/14* (2013.01); *G01K 11/3206* (2013.01); *G01L 1/246* (2013.01)

(58) Field of Classification Search
CPC ............ G01N 21/774; G01N 21/7743; G01N 21/7703; G01D 5/35374; G01D 5/35316; G01D 5/3537; G01K 11/3206; G01K 1/14; G02B 6/02209; G02B 6/02204; G02B 6/022; G02B 6/00
USPC .......................................... 385/12, 13, 32, 37
See application file for complete search history.

(56) References Cited

U.S. PATENT DOCUMENTS

| | | | | | |
|---|---|---|---|---|---|
| 5,321,258 | A | * | 6/1994 | Kinney ..................... | 250/227.21 |
| 5,602,949 | A | * | 2/1997 | Epworth .......................... | 385/37 |
| 5,699,461 | A | * | 12/1997 | Minemoto et al. .............. | 385/12 |
| 5,732,167 | A | * | 3/1998 | Ishiko et al. ..................... | 385/12 |
| 6,535,685 | B1 | * | 3/2003 | Tullis .............................. | 385/137 |
| 6,600,149 | B2 | * | 7/2003 | Schulz et al. ............. | 250/227.14 |
| 6,650,821 | B1 | * | 11/2003 | Koyano et al. ................. | 385/136 |
| 6,778,735 | B2 | * | 8/2004 | Miller et al. ..................... | 385/37 |
| 6,829,397 | B2 | | 12/2004 | Wang et al. | |
| 6,838,157 | B2 | * | 1/2005 | Subramanian ................ | 428/173 |
| 7,196,318 | B2 | | 3/2007 | Shin et al. | |
| 7,604,402 | B2 | * | 10/2009 | Boese et al. ................... | 374/179 |
| 7,773,841 | B2 | * | 8/2010 | Varadarajan et al. ........... | 385/32 |
| 7,974,503 | B2 | | 7/2011 | Huang et al. | |
| 8,174,703 | B2 | * | 5/2012 | Wang et al. .................... | 356/480 |
| 8,285,086 | B2 | * | 10/2012 | Nishikawa et al. ............. | 385/12 |
| 8,340,482 | B2 | * | 12/2012 | Arashitani et al. .............. | 385/32 |
| 8,351,029 | B2 | * | 1/2013 | Nishikawa et al. ........... | 356/128 |
| 2001/0030281 | A1 | * | 10/2001 | Schulz et al. ............ | 250/227.21 |

(Continued)

*Primary Examiner* — Rhonda Peace
(74) *Attorney, Agent, or Firm* — Alan D. Kamrath; Kamrath IP Lawfirm, P.A.

(57) ABSTRACT

A fiber optic sensor structure includes a first substrate, a second substrate, a third substrate, a first fiber optic sensor and a second fiber optic sensor. The first substrate has a first groove, while the second substrate has a second groove. A manufacturing method includes: arranging the first fiber optic sensor in the first groove and arranging the second fiber optic sensor the second groove; and stacking the second substrate on the first substrate and stacking the third substrate on the second substrate. When assembled, the first fiber optic sensor is provided between the first substrate and the second substrate, and the second fiber optic sensor is provided between the second substrate and the third substrate to form a double-layer fiber optic sensor.

18 Claims, 5 Drawing Sheets

(56) References Cited

U.S. PATENT DOCUMENTS

| | | | |
|---|---|---|---|
| 2002/0106157 A1* | 8/2002 | Hu et al. | 385/37 |
| 2002/0131709 A1* | 9/2002 | Miller et al. | 385/37 |
| 2004/0202886 A1* | 10/2004 | Subramanian | 428/632 |
| 2005/0061058 A1* | 3/2005 | Willsch et al. | 73/23.32 |
| 2007/0223560 A1* | 9/2007 | Boese et al. | 374/141 |
| 2008/0095496 A1* | 4/2008 | Varadarajan et al. | 385/32 |
| 2010/0061678 A1* | 3/2010 | Swinehart et al. | 385/12 |
| 2010/0080501 A1* | 4/2010 | Saunders et al. | 385/12 |
| 2010/0080502 A1* | 4/2010 | Nishikawa et al. | 385/12 |
| 2011/0058768 A1* | 3/2011 | Swinehart et al. | 385/13 |
| 2014/0321799 A1* | 10/2014 | Udd | 385/13 |
| 2014/0369641 A1* | 12/2014 | Chiang et al. | 385/12 |

* cited by examiner

FIBER OPTIC SENSOR MANUFACTURING METHOD AND STRUCTURE THEREOF

BACKGROUND OF THE INVENTION

1. Field of the Invention

The present invention relates to a fiber optic sensor manufacturing method and structure thereof. More particularly, the present invention relates to a multi function fiber optic sensor manufacturing method and structure thereof.

2. Description of the Related Art

U.S. Pat. No. 7,196,318, entitled "Fiber-Optic Sensing System," discloses a fiber-optic sensing system utilizing a fiber-grating-based sensor for a physical parameter, e.g., a pressure or a temperature. Many kinds of fiber-grating-based sensors may be used for this purpose, but in-fiber gratings, such as Fiber Bragg Grating, Long Period Grating and Surface Corrugated Long Period Fiber Grating, are particularly suitable.

Another U.S. Pat. No. 7,974,503, entitled "Fiber Grating Sensor," discloses a fiber grating sensor including an elastic circular plate and one or two FBGs attached to the bottom surface of the elastic circular plate. Two ends of the FBG are connected to an optic fiber for signal transmission. The fiber grating sensor readouts are independent of temperature variation. The fiber grating sensor mechanism may be applied in a variety of sensors, such as a gauge pressure transducer, a differential pressure transducer, a load cell and a displacement transducer, with a distributive design, and for various purposes.

Another U.S. Pat. No. 6,829,397, entitled "Dual Fiber Bragg Grating Strain Sensor System," discloses a dual fiber Bragg grating strain sensor system comprising a broadband light source, a power reading unit, and a sensor unit having a first fiber Bragg grating and a second fiber Bragg grating arranged adjacent to each other. When the broadband light reaches the sensor unit through the power reading unit, the light that corresponds to the intersection between the spectra of the two FBGs is backreflected and is detected by an optical power meter/detector at the detection port.

However, there is a need of improving the fiber optic sensor structure or the fiber optic sensor system disclosed in U.S. Pat. Nos. 7,196,318, 7,974,503, and 6,829,397 for easy use. The above-mentioned patents are incorporated herein by reference for purposes including, but not limited to, indicating the background of the present invention and illustrating the state of the art.

As is described in greater detail below, the present invention provides a fiber optic sensor manufacturing method and structure thereof. A recessed groove is formed on at least one substrate to receive a fiber optic sensor. The fiber optic sensor is further sealed to form a single sensor structure or a plurality of the substrates, and the fiber optic sensors are stacked to form a complex sensor structure in such a way to mitigate and overcome the above problem.

SUMMARY OF THE INVENTION

The primary objective of this invention is to provide a fiber optic sensor manufacturing method and structure thereof. A recessed groove is formed on at least one substrate to receive a fiber optic sensor which is further sealed by another substrate, thereby forming a single sensor structure. Accordingly, the fiber optic sensor manufacturing method and structure are successful in simplifying the structure and the manufacture process of the fiber optic sensor.

Another objective of this invention is to provide a fiber optic sensor manufacturing method and structure thereof. A plurality of substrates and a plurality of fiber optic sensors are stacked to form a complex sensor structure. Accordingly, the fiber optic sensor manufacturing method and structure are successful in simplifying the structure of the fiber optic sensor and in easy use.

The fiber optic sensor manufacturing method in accordance with an aspect of the present invention includes:
 providing a predetermined film on a surface of a base plate;
 transforming the predetermined film into at least one predetermined pattern on the surface of the base plate;
 forming a first substrate layer on the surface of the base plate with the predetermined pattern, thereby forming at least one groove on the first substrate layer;
 inserting at least one fiber optic sensor in the groove of the first substrate layer; and
 adhering a second substrate layer to the first substrate layer to seal the groove, thereby forming a sensor structure.

In a separate aspect of the present invention, the surface of the base plate is pre-treated prior to providing the predetermined film.

In a further separate aspect of the present invention, the predetermined film is made of a photo-resist material.

In yet a further separate aspect of the present invention, the predetermined film is formed by spin-coating a photo-resist material on the surface of the base plate, and the predetermined film is processed by an exposure process and a development process to form the predetermined pattern.

In yet a further separate aspect of the present invention, the first substrate layer is formed by spin-coating a macromolecular material on the surface of the base plate.

In yet a further separate aspect of the present invention, the predetermined film and the first substrate layer are treated by a soft-baking process.

In yet a further separate aspect of the present invention, a surface of the first substrate layer is treated by a surface modification process.

The fiber optic sensor structure in accordance with an aspect of the present invention includes:
 a first substrate layer provided with a first groove;
 a first fiber optic sensor arranged in the first groove;
 a second substrate layer attached to the first substrate layer to seal the first groove, with the second substrate layer provided with a second groove;
 a second fiber optic sensor arranged in the second groove; and
 a third substrate layer attached to the second substrate layer to seal the second groove;
 with the first fiber optic sensor embedded between the first substrate layer and the second substrate layer, and with the second fiber optic sensor embedded between the second substrate layer and the third substrate layer to form a double fiber optic sensor structure.

In yet a further separate aspect of the present invention, the first substrate layer, the second substrate layer and the third substrate layer are made of a macromolecular material, an organosilicon material or a macromolecular organosilicon material.

In yet a further separate aspect of the present invention, the macromolecular organosilicon material is selected from PDMS (Polydimethylsiloxane).

In yet a further separate aspect of the present invention, the first fiber optic sensor and the second fiber optic sensor are selected from a fiber Bragg grating member.

In yet a further separate aspect of the present invention, the third substrate layer is provided with a third groove in which to receive a third fiber optic sensor, and a fourth substrate layer is attached to the third substrate layer to seal the third groove to form a triple fiber optic sensor structure.

In yet a further separate aspect of the present invention, the third substrate layer is formed with a window in which to expose at least one section of the second fiber optic sensor.

In yet a further separate aspect of the present invention, an end section of the first fiber optic sensor is vertically mis-aligned with that of the second fiber optic sensor.

In yet a further separate aspect of the present invention, at least one parallel section of the first fiber optic sensor is vertically mis-aligned with that of the second fiber optic sensor.

In yet a further separate aspect of the present invention, at least one additional fiber optic sensor is arranged within an inner area formed by the first fiber optic sensor between the first substrate and the second substrate to compact the entire dimensions of the triple fiber optic sensor structure.

Further scope of the applicability of the present invention will become apparent from the detailed description given hereinafter. However, it should be understood that the detailed description and specific examples, while indicating preferred embodiments of the invention, are given by way of illustration only, since various modifications will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

It is noted that a fiber optic sensor manufacturing method and structure thereof in accordance with the preferred embodiments of the present invention can be applicable to various fiber optic sensors, i.e. a single fiber optic sensor or a multi function fiber optic sensor. Furthermore, the fiber optic sensor manufacturing method in accordance with the preferred embodiments of the present invention is suitable for applying several processes, including a spin coating process, an exposure and development process and a soft baking process, for example, which are not limitative of the present invention.

Figure 1:
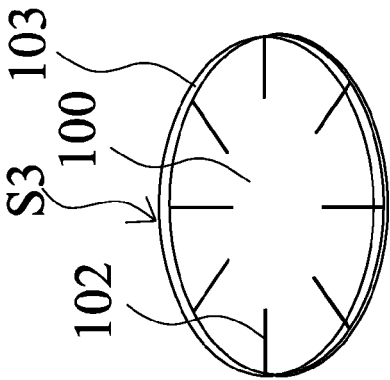
FIG. 1 is a series of perspective views of a fiber optic sensor manufacturing method in accordance with a preferred embodiment of the present invention.
Figure 1:
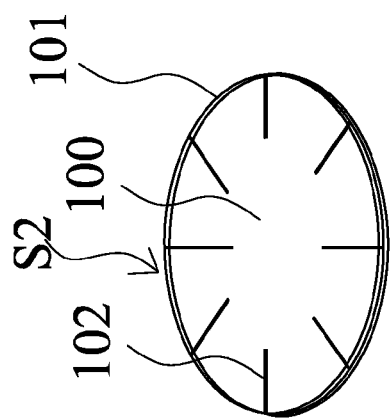
Figure 1:
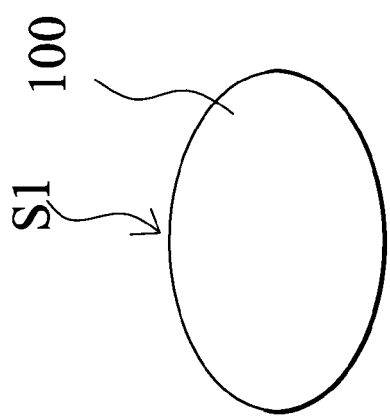
Figure 1:
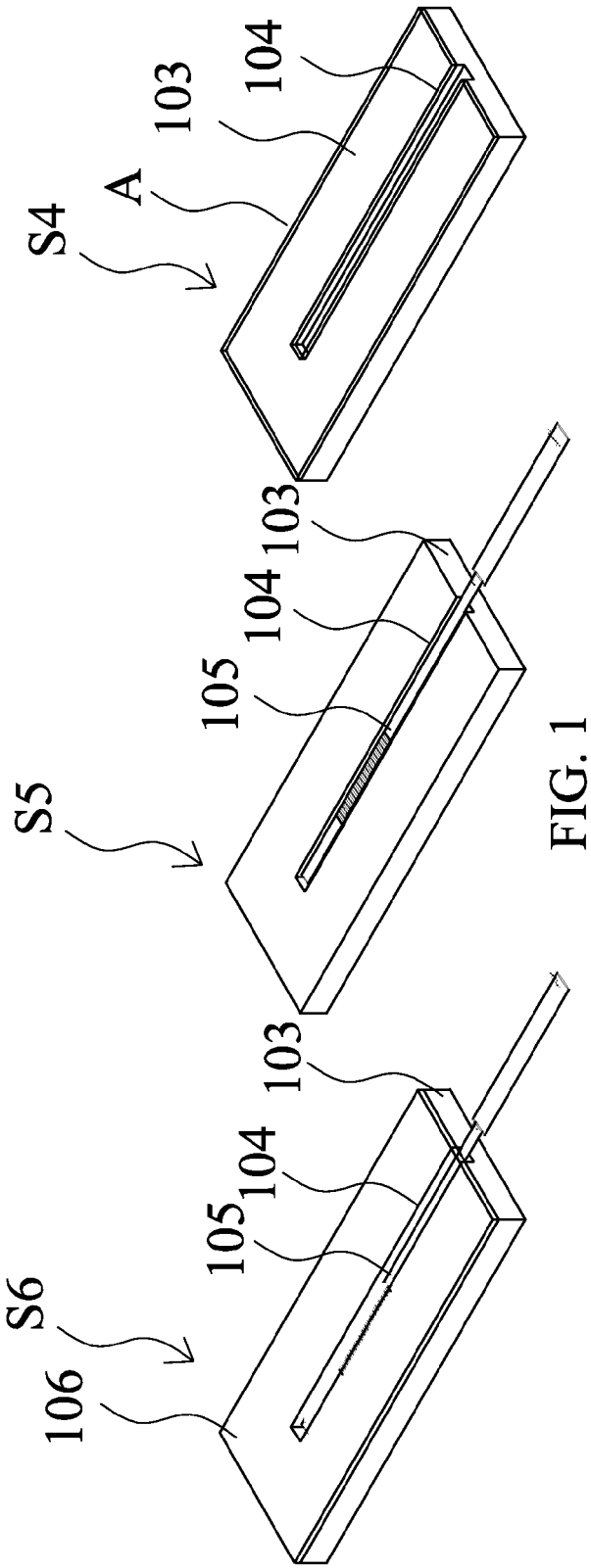

Referring initially to FIG. 1, the fiber optic sensor manufacturing method of the preferred embodiment of the present invention includes six major steps which are simplified in description, but six or more steps are not limitative of the present invention. The fiber optic sensor manufacturing method of the preferred embodiment of the present invention includes the step S1 of: preparing a base plate 100, including at least one flat surface (upper surface). By way of example, the base plate 100 has a predetermined thickness and is selected from a circular plate or the like. In a preferred embodiment, the flat surface of the base plate 100 is washed and cleaned or dried in preparing.

With continued reference to FIG. 1, the fiber optic sensor manufacturing method of the preferred embodiment of the present invention further includes the step S2 of: providing a predetermined film 101 on at least one predetermined region of the flat surface of the base plate 100 in an appropriate manner. In the step S2, the predetermined film 101 is further transformed into at least one predetermined pattern 102 on the surface of the base plate 100. By way of example, the predetermined pattern 102 includes a plurality of protrusion lines radially extending from a center point.

Still referring to FIG. 1, by way of example, the base plate 100 is selected from a silicon wafer or is made of other materials. The predetermined film 101 is made of a photo-resist material which is coated on the flat surface of the base plate 100 to form a predetermined thickness of the predetermined film 101 by a spin coating process. Subsequently, the predetermined film 101 is processed by a soft baking process, an exposure process and a development process. After removing the predetermined film 101, the predetermined pattern 102 remains on the flat surface of the base plate 100. Accordingly, the flat surface of the base plate 100 formed with the predetermined pattern 102 can be applied in manufacturing the fiber optic sensor member.

Still referring to FIG. 1, the fiber optic sensor manufacturing method of the preferred embodiment of the present invention further includes the step S3 of: forming a first substrate layer 103 or other substrate layers (i.e. second substrate layer) on the flat surface of the base plate 100 with the predetermined pattern 102, thereby forming at least one groove 104 on the first substrate layer 103, as best shown in the step S4.

Still referring to FIG. 1, by way of example, the first substrate layer 103 or the like is formed by spin-coating a macromolecular material on the surface of the base plate 100. The first substrate layer 103 is made of a macromolecular material, an organosilicon material or a macromolecular organosilicon material. In a preferred embodiment, the macromolecular organosilicon material is selected from PDMS (Polydimethylsiloxane). The first substrate layer 103 formed on the flat surface of the base plate 100 may be treated by a soft baking process.

Still referring to FIG. 1, the fiber optic sensor manufacturing method of the preferred embodiment of the present invention further includes the step S4 of: removing or peeling off the first substrate layer 103 from the flat surface of the base plate 100. In a preferred embodiment, a region of the first substrate layer 103 with the groove 104 is cut and sized to a predetermined form according the design need.

Still referring to FIG. 1, the fiber optic sensor manufacturing method of the preferred embodiment of the present invention further includes the step S5 of: inserting at least one fiber optic sensor 105 in the groove 104 of the first substrate layer 103. Furthermore, at least one surface area adjacent to the groove 104 of the first substrate layer 103 is treated by a corona treatment or other surface modification treatments.

With continued reference to FIG. 1, by way of example, a portable corona treater is operated with an energy intensity of 48,000V to 10,000V and is applied to modify the surface of the first substrate layer 103. After being treated, the surface of the first substrate layer 103 is changed from a hydrophorbic (or lipophilic) surface to a hydrophilic surface layer. Accordingly, a modified surface layer "A" of the first substrate layer 103 is capable of adhering with other material.

Still referring to FIG. 1, the fiber optic sensor manufacturing method of the preferred embodiment of the present invention further includes the step S6 of: adhering a second substrate layer 106 to the first substrate layer 103 to seal the groove 104, thereby forming a sensor structure. The fiber optic sensor 105 is provided between the first substrate layer 103 and the second substrate layer 106.

Figure 2:
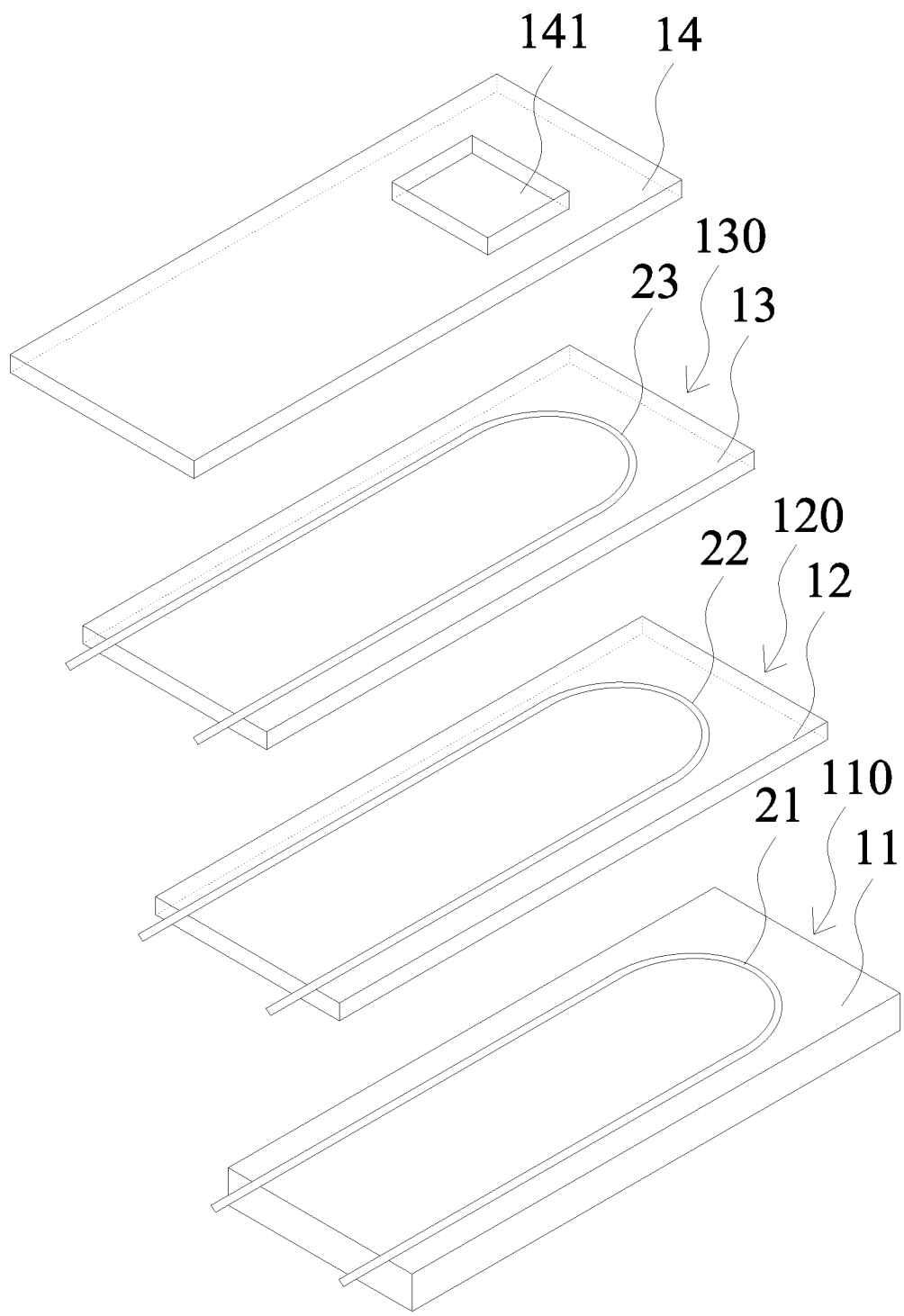
FIG. 2 is an exploded perspective view of a fiber optic sensor structure in accordance with a first preferred embodiment of the present invention.
Figure 3:
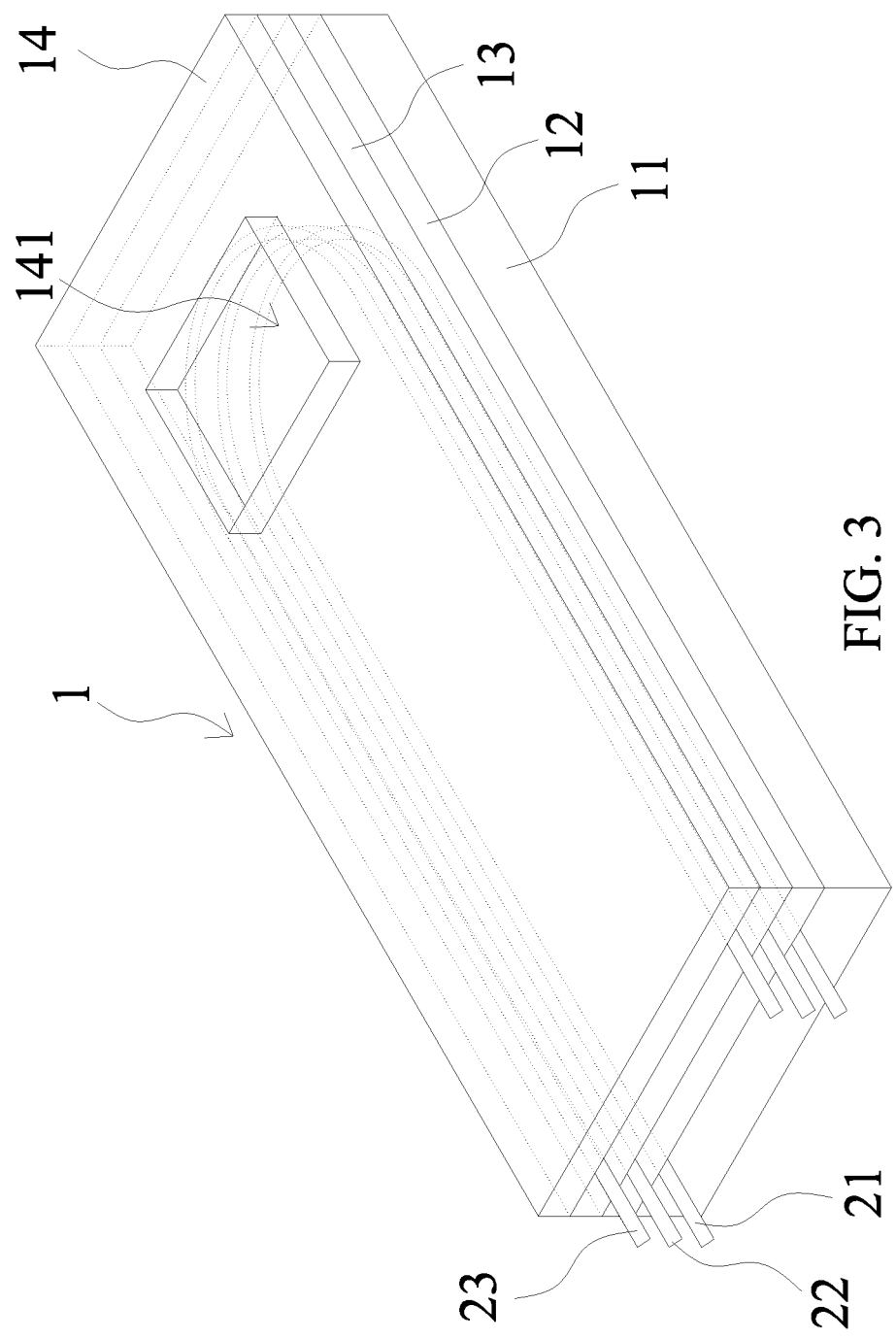
FIG. 3 is an assembled perspective view of the fiber optic sensor structure in accordance with the first preferred embodiment of the present invention.

Turning now to FIGS. 2 and 3, the fiber optic sensor structure in accordance with the first preferred embodiment of the present invention includes a first substrate 11, a first fiber optic sensor 21, a second substrate 12, a second fiber optic sensor 22, a third substrate 13, a third fiber optic sensor 23 and a fourth substrate 14 to form a triple fiber optic sensor structure 1. The first substrate 11, the second substrate 12, the third substrate 13 and the fourth substrate 14 are stacked in order and are made of identical or different materials to thereby reduce manufacturing cost.

Still referring to FIGS. 2 and 3, the first fiber optic sensor 21 is provided between the first substrate 11 and the second substrate 12, the second fiber optic sensox 22 is provided between the second substrate 12 and the third substrate 13, and the third fiber optic sensor 23 is provided between the third substrate 13 and the fourth substrate 14, thereby spacing each other apart. In a preferred embodiment, the first fiber optic sensor 21, the second fiber optic sensor 22 and the third fiber optic sensor 23 are arranged in a vertical alignment and are extended in parallel. In an alternative, at least two of the first fiber optic sensor 21, the second fiber optic sensor 22 and the third fiber optic sensor 23 are arranged in a relatively vertical mis-alignment.

Referring again to FIGS. 2 and 3, the first substrate 11 is made of a macromolecular organosilicon material which may be selected from Polydimethylsiloxane (PDMS) or other human skin suitable materials. A surface of the first substrate 11 is provided with a first groove 110 which is formed from an elongated groove or other groove-like shapes.

Still referring to FIGS. 2 and 3, the first fiber optic sensor 21 is selected from a Fiber Bragg Grating (FBG) member or other fiber optic sensors. The first fiber optic sensor 21 is suitable for measuring a body temperature, a blood pressure, a strain, a pressure, etc. A first end of the first fiber optic sensor 21 is inserted into the first groove 110 of the first substrate 11, and the second substrate 12 is attached to the first substrate 11 to seal the first groove 110. In a preferred embodiment, the modified surface layer "A" is selectively formed on one or both of the first substrate 11 and the second substrate 12, as best shown in FIG. 1, for adhering purposes. A second end of the first fiber optic sensor 21 further connects with a fiber optic sensing system or other systems.

Still referring to FIGS. 2 and 3, the second substrate 12 is made of a macromolecular organosilicon material which may be selected from Polydimethylsiloxane (PDMS). A surface of the second substrate 12 is provided with a second groove 120 which is formed from an elongated groove or other groove-like shapes. In an assembling operation, the second substrate 12 is attached to the first substrate 11, thereby embedding the first fiber optic sensor 21 between an upper surface of the first substrate 11 and a lower surface of the second substrate 12.

Still referring to FIGS. 2 and 3, the second fiber optic sensor 22 is selected from a Fiber Bragg Grating (FBG) member or other fiber optic sensors. The second fiber optic sensor 22 is suitable for measuring a body temperature, a blood pressure, a strain, a pressure, etc. A first end of the second fiber optic sensor 22 is inserted into the second groove 120 of the second substrate 12, and the third substrate 13 is attached to the second substrate 12 to seal the second groove 120. In a preferred embodiment, the modified surface layer "A" is selectively formed on one or both of the second substrate 12 and the third substrate 13, as best shown in FIG. 1, for adhering purposes. A second end of the second fiber optic sensor 22 further connects with a fiber optic sensing system or other systems.

Still referring to FIGS. 2 and 3, the third substrate 13 is made of a macromolecular organosilicon material which may be selected from Polydimethylsiloxane (PDMS). A surface of the third substrate 13 is provided with a third groove 130 which is formed from an elongated groove or other groove-like shapes. In an assembling operation, the third substrate 13 is attached to the second substrate 12, thereby embedding the second fiber optic sensor 22 between an upper surface of the second substrate 12 and a lower surface of the third substrate 13.

Still referring to FIGS. 2 and 3, the third fiber optic sensor 23 is selected from a Fiber Bragg Grating (FBG) member or other fiber optic sensors. The third fiber optic sensor 23 is suitable for measuring a body temperature, a blood pressure, a blood concentration, a strain, a pressure, etc. A first end of the third fiber optic sensor 23 is inserted into the third groove 130 of the third substrate 13, and the fourth substrate 14 is attached to the third substrate 13 to seal the third groove 130. In a preferred embodiment, the modified surface layer "A" is selectively formed on one or both of the third substrate 13 and the fourth substrate 14, as best shown in FIG. 1, for adhering purposes. A second end of the third fiber optic sensor 23 further connects with a fiber optic sensing system or other systems.

Still referring to FIGS. 2 and 3, the fourth substrate 14 is made of a macromolecular organosilicon material which may be selected from Polydimethylsiloxane (PDMS). A surface of the fourth substrate 14 is provided with a window 141 in which to expose at least one section of the third fiber optic sensor 23 for allowing a sample drop. In an assembling operation, the fourth substrate 14 is attached to the third substrate 13, thereby embedding the rest section of the third fiber optic sensor 23 between an upper surface of the third substrate 13 and a lower surface of the fourth substrate 14.

Figure 4:
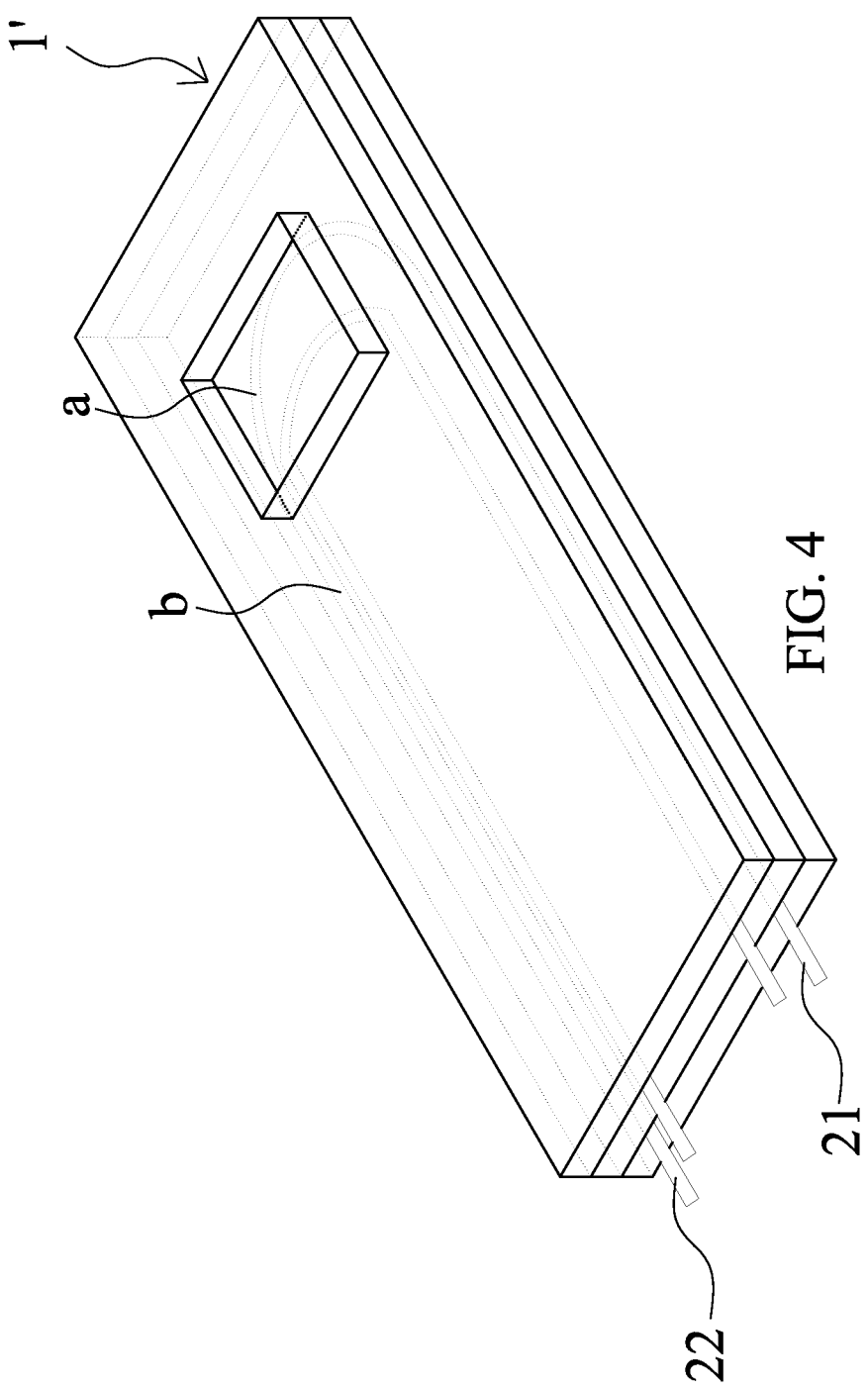
FIG. 4 is an assembled perspective view of the fiber optic sensor structure in accordance with a second preferred embodiment of the present invention.

Turning now to FIG. 4, the fiber optic sensor structure in accordance with the second preferred embodiment of the present invention is a double fiber optic sensor structure 1' formed from three substrate layers. An end section "a" of the first fiber optic sensor 21 is vertically mis-aligned with that of the second fiber optic sensor 22 in order to avoid interference therebetween. Furthermore, at least one parallel section "b" of the first fiber optic sensor 21 is also vertically mis-aligned with that of the second fiber optic sensor 22 in order to avoid interference therebetween.

Figure 5:
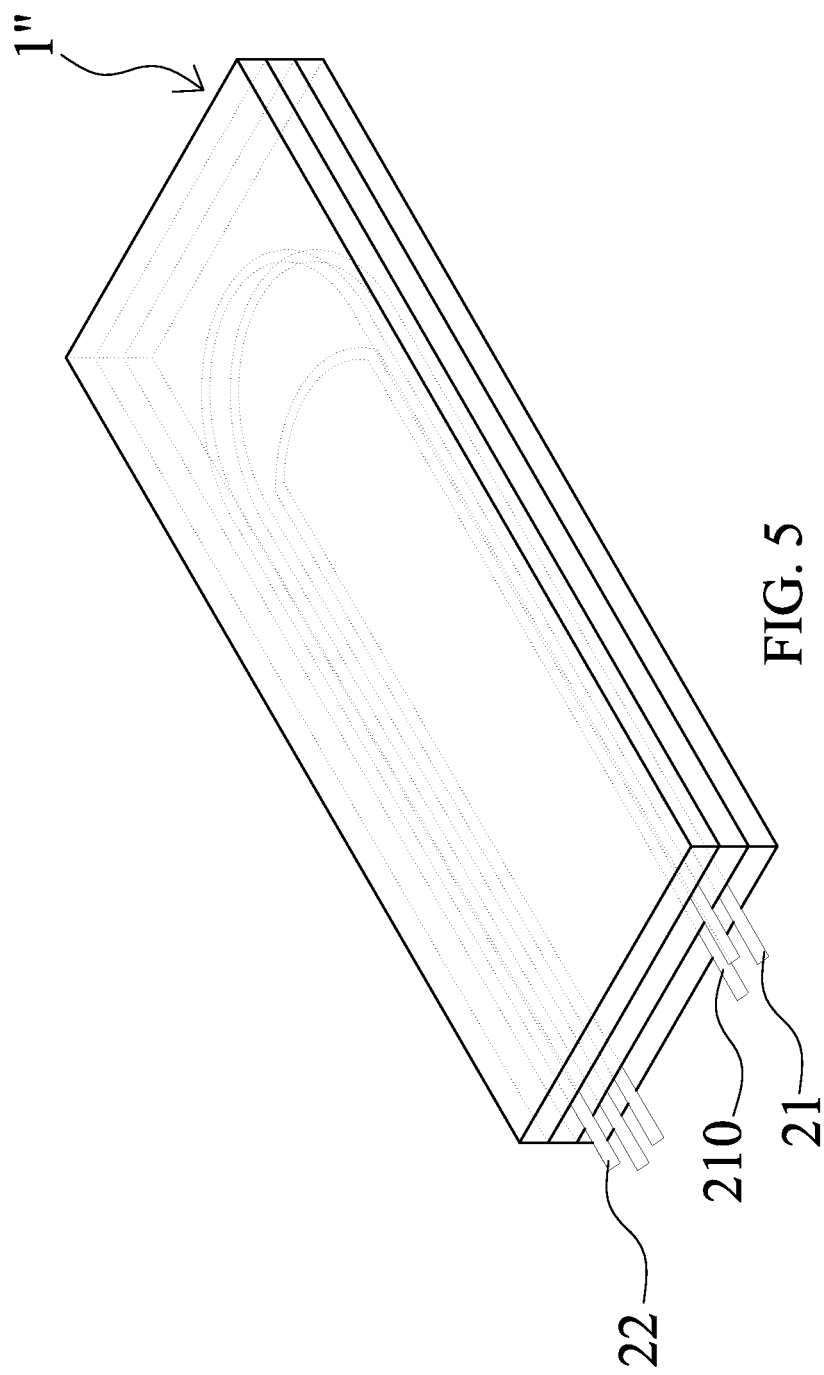
FIG. 5 is an assembled perspective view of the fiber optic sensor structure in accordance with a third preferred embodiment of the present invention.

Turning now to FIG. 5, the fiber optic sensor structure in accordance with the third preferred embodiment of the present invention is another type of the triple fiber optic sensor structure 1" formed from three substrate layers. At least one additional fiber optic sensor 210, which is inserted in a groove, is arranged within an inner area formed by the first fiber optic sensor 21 between the first substrate 11 and the second substrate 12 to compact the entire dimensions of the triple fiber optic sensor structure 1". In order to simplify the entire structure, the second fiber optic sensor 22 and the third substrate 13 are selectively omitted to form a double fiber optic sensor structure.

Although the invention has been described in detail with reference to its presently preferred embodiments, it will be understood by one of ordinary skills in the art that various modifications can be made without departing from the spirit and the scope of the invention, as set forth in the appended claims.

What is claimed is:

1. A fiber optic sensor manufacturing method, comprising:
providing a predetermined film on a surface of a base plate;
transforming the predetermined film into at least one predetermined pattern on the surface of the base plate;
forming a first substrate layer on the surface of the base plate with the at least one predetermined pattern, thereby forming at least one groove on the first substrate layer;
inserting at least one fiber optic sensor in the at least one groove of the first substrate layer; and
adhering a second substrate layer to the first substrate layer to seal the at least one groove, thereby forming a sensor structure.

2. The fiber optic sensor manufacturing method as defined in claim 1, wherein the surface of the base plate is pre-treated prior to providing the predetermined film.

3. The fiber optic sensor manufacturing method as defined in claim 1, wherein the predetermined film is made of a photo-resist material.

4. The fiber optic sensor manufacturing method as defined in claim 1, wherein the predetermined film is formed by spin-coating a photo-resist material on the surface of the base plate.

5. The fiber optic sensor manufacturing method as defined in claim 1, wherein the predetermined film is processed by an exposure process and a development process to form the at least one predetermined pattern.

6. The fiber optic sensor manufacturing method as defined in claim 1, wherein the first substrate layer is formed by spin-coating a macromolecular material on the surface of the base plate.

7. The fiber optic sensor manufacturing method as defined in claim 1, wherein the predetermined film and the first substrate layer are treated by a soft-baking process.

8. The fiber optic sensor manufacturing method as defined in claim 1, wherein a surface of the first substrate layer is treated to form a surface modification layer by a surface modification process.

9. The fiber optic sensor manufacturing method as defined in claim 1, peeling off the first substrate layer from the base plate.

10. A fiber optic sensor structure comprising:
a first substrate layer provided with a first groove;
a first fiber optic sensor arranged in the first groove;
a second substrate layer attached to the first substrate layer to seal the first groove, with the second substrate layer provided with a second groove;
a second fiber optic sensor arranged in the second groove; and
a third substrate layer attached to the second substrate layer to seal the second groove;
wherein the first fiber optic sensor is embedded between the first substrate layer and the second substrate layer, wherein the second fiber optic sensor is embedded between the second substrate layer and the third substrate layer to form a double fiber optic sensor structure, and wherein the third substrate layer is formed with a window in which to expose at least one section of the second fiber optic sensor.

11. The fiber optic sensor structure as defined in claim 10, wherein the first substrate layer, the second substrate layer and the third substrate layer are made of a macromolecular material, an organosilicon material or a macromolecular organosilicon material.

12. The fiber optic sensor structure as defined in claim 11, wherein the macromolecular organosilicon material is selected from PDMS.

13. The fiber optic sensor structure as defined in claim 10, wherein the first fiber optic sensor and the second fiber optic sensor are selected from a fiber Bragg grating member.

14. The fiber optic sensor structure as defined in claim 10, wherein the third substrate layer is provided with a third groove in which to receive a third fiber optic sensor, and wherein a fourth substrate layer is attached to the third substrate layer to seal the third groove to form a triple fiber optic sensor structure.

15. A fiber optic sensor structure comprising:
a first substrate layer provided with a first groove;
a first fiber optic sensor arranged in the first groove;
a second substrate layer attached to the first substrate layer to seal the first groove, with the second substrate layer provided with a second groove;
a second fiber optic sensor arranged in the second groove; and
a third substrate layer attached to the second substrate layer to seal the second groove;
wherein the first fiber optic sensor is embedded between the first substrate layer and the second substrate layer, wherein the second fiber optic sensor is embedded between the second substrate layer and the third substrate layer to form a double fiber optic sensor structure, and wherein an end section of the first fiber optic sensor is vertically mis-aligned with that of the second fiber optic sensor.

16. A fiber optic sensor structure comprising:
a first substrate layer provided with a first groove;
a first fiber optic sensor arranged in the first groove;
a second substrate layer attached to the first substrate layer to seal the first groove, with the second substrate layer provided with a second groove;
a second fiber optic sensor arranged in the second groove; and
a third substrate layer attached to the second substrate layer to seal the second groove;
wherein the first fiber optic sensor is embedded between the first substrate layer and the second substrate layer, wherein the second fiber optic sensor is embedded between the second substrate layer and the third substrate layer to form a double fiber optic sensor structure, and wherein at least one parallel section of the first fiber optic sensor is vertically mis-aligned with that of the second fiber optic sensor.

17. A fiber optic sensor structure comprising:
a first substrate layer provided with a first groove and a second groove;
a first fiber optic sensor arranged in the first groove;
a second fiber optic sensor arranged in the second groove; and
a second substrate layer attached to the first substrate layer to seal the first groove and the second groove;
wherein the first fiber optic sensor and the second fiber optic sensor are embedded between the first substrate layer and the second substrate layer to form a double fiber optic sensor structure, and wherein the second substrate layer is formed with a window in which to expose at least one section of the first fiber optic sensor or the second fiber optic sensor.

18. The fiber optic sensor structure as defined in claim 17, wherein the second substrate layer is provided with a third groove in which to receive a third fiber optic sensor, and wherein a fourth substrate layer is attached to the third substrate layer to seal the third groove to form a triple fiber optic sensor structure.

\* \* \* \* \*